US006937716B2

(12) United States Patent
Lai et al.

(10) Patent No.: US 6,937,716 B2
(45) Date of Patent: Aug. 30, 2005

(54) METHOD OF AUTOMATICALLY CHANGING A CALLING MODE OF TELEPHONE AS TIMER SETTING CHANGES

(75) Inventors: Cheng-Shing Lai, Taipei Hsien (TW); Qiang Fan, Nanking (CN)

(73) Assignee: Inventec Appliances Corp., Taipei Hsien (TW)

( * ) Notice: Subject to any disclaimer, the term of this patent is extended or adjusted under 35 U.S.C. 154(b) by 136 days.

(21) Appl. No.: 10/388,614

(22) Filed: Mar. 17, 2003

(65) Prior Publication Data

US 2004/0184597 A1 Sep. 23, 2004

(51) Int. Cl.[7] ................................................ H04M 1/00

(52) U.S. Cl. ............. 379/373.02; 379/372; 379/373.01; 379/373.03

(58) Field of Search ............................ 379/372, 373.01, 379/373.02, 373.03

(56) References Cited

U.S. PATENT DOCUMENTS 6,763,105 B1 * 7/2004 Miura et al. ........... 379/373.01

* cited by examiner

*Primary Examiner*—Jefferey F. Harold
(74) *Attorney, Agent, or Firm*—Bacon & Thomas, PLLC

(57) ABSTRACT

A primary object of the present invention is to provide a method of automatically changing a calling mode of a telephone having a program timer installed therein as a timer setting changes, wherein the program timer comprising an on/off item responsible for controlling an on/off of the program timer, a timer setting item responsible for setting a time slot of an activation of the program timer, and a calling mode item responsible for setting a plurality of ring types, so that when the program timer is on and the time slot has been set by the timer setting item, a microprocessor of the telephone will activate the ring type set by the calling mode item for informing of an incoming call within the time slot.

5 Claims, 1 Drawing Sheet

METHOD OF AUTOMATICALLY CHANGING A CALLING MODE OF TELEPHONE AS TIMER SETTING CHANGES

FIELD OF THE INVENTION

The present invention relates to calling modes of telephone and more particularly to a method of automatically changing one of a plurality of calling modes of telephone as a timer setting changes.

BACKGROUND OF THE INVENTION

Over the past several decades there has been a simultaneous growth in information technology and electronics, leading to an increasing use of computer, electronic, mobile communication, and network products. Such really bring a great convenience to our daily life. Correspondingly, people have an increasing demand to the quality of consumer products such as cellular phones as they are available in an even faster pace. Cellular phones have gained popularity widely throughout the world. For some people, a cellular phone has become a ubiquitous tool for both personal and work related tasks. Accordingly, all global cellular phone manufacturers continuously endeavor to develop new models for providing more convenient, effective, and user friendly services to consumers. Thus, a leading indicator of one cellular phone manufacturer can be decided based on whether it can provide the above services.

As stated above, cellular phones are very popular and widely used in our daily life. Such increase is attributable to convenience of the cellular phone as a mobile communication device. However, the existing cellular phone still suffered from several disadvantages in its operation and design. For example, prior to sleeping in the night, a cellular phone user may adjust ring volume to a minimum or change it into a vibration mode in order not to bother himself/herself and/or other members of the family when a potential call comes while sleeping. Unfortunately, such procedure regarding ring volume control of cellular phone is tedious. In detail, the user has to manually adjust ring volume, select a desired ring type or close the ring, and sequentially select a menu, a menu item, and a secondary menu associated with the menu item by pressing suitable keys by following instructions shown on a display prior to setting a desired calling mode. Moreover, a clear operation has to be done in a next morning. In view of this, it is really bothersome. One may think of turning off the cellular phone before sleeping. But it can miss one or more potential important calls. Thus, such is not desirable.

As stated above, for meeting the increasing demand of consumers about cellular phone and increasing market share, the global cellular phone manufacturers must produce high quality, multifunctional, user-friendly cellular phones. Thus, it is desirable among the cellular phone manufacturers and users to provide a novel method of automatically changing a calling mode of telephone while sleeping in order to overcome the above drawbacks of the prior art.

SUMMARY OF THE INVENTION

A primary object of the present invention is to provide a method of automatically changing a calling mode of telephone as a program timer setting changes. By utilizing this method, the above drawbacks of the prior art can be overcome. These drawbacks comprise the following: Before sleep, a cellular phone user has to adjust ring volume to a minimum or change it into a vibration mode in order not to bother himself/herself and/or other members of the family when a potential call comes. The user has to manually adjust ring volume, select a desired ring type or close the ring, and sequentially select a menu, a menu item, and a secondary menu associated with the menu item by pressing suitable keys by following instructions shown on a display prior to setting a desired calling mode. A clear operation has to be done in a next morning.

To achieve the above and other objects, the present invention provides a method of automatically changing a calling mode of a telephone having a program timer installed therein as a timer setting changes, of which the program timer comprises an on/off item, a timer setting item, and a calling mode item wherein the on/off item is responsible for controlling an on/off of the program timer, the timer setting item is responsible for setting a time slot of an activation of the program timer, and the calling mode item is responsible for setting a plurality of ring types so that when the program timer is on and the time slot has been set by the timer setting item, a microprocessor of the telephone will activate the ring type set by the calling mode item for informing of an incoming call within the time slot. Thus, the invention can prevent an incoming call from bothering the user and/or other members of the family while sleeping.

The above and other objects, features and advantages of the present invention will become apparent from the following detailed description taken with the accompanying drawings.

DETAILED DESCRIPTION OF THE PREFERRED EMBODIMENTS

Figure 1:
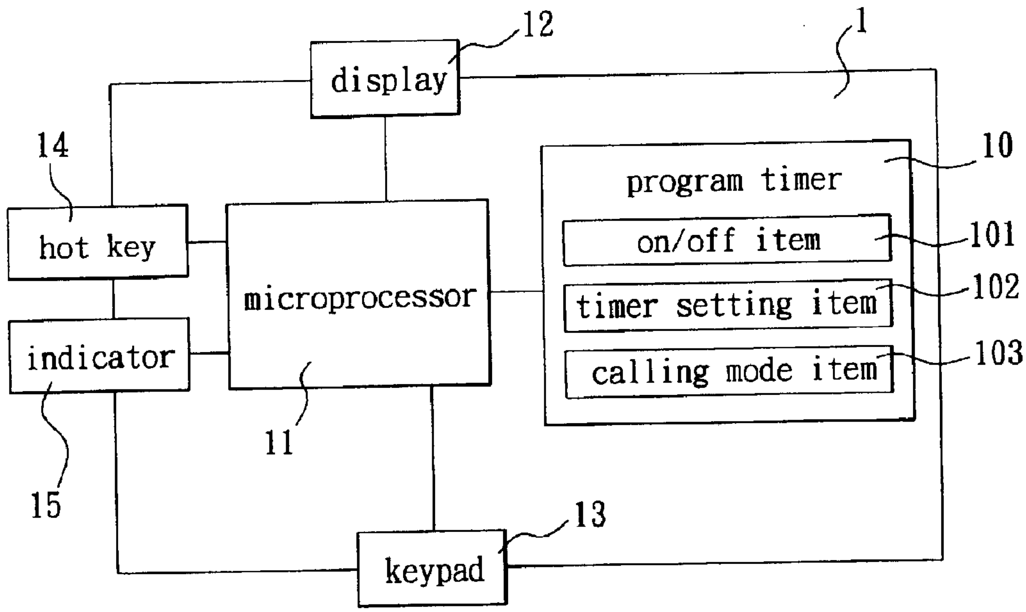
FIG. 1 is a block diagram showing associated components of a telephone and menu items of a program timer according to the invention.

Referring to FIG. 1, a method of automatically changing a calling mode of telephone 1 as a timer setting changes in accordance with the invention is illustrated. The telephone 1 is either a cellular phone or conventional telephone set. The telephone 1 comprises a program timer 10 including an on/off item 101, a timer setting item 102, and a calling mode item 103. The on/off item 101 is responsible for controlling an on/off of the program timer 10. The timer setting item 102 is responsible for setting a time slot of an activation of the program timer 10. The calling mode item 103 is able to permit a user to select one of a plurality of ring types (i.e., calling modes of the telephone 1) when the program timer 10 is on and a time slot has been set by the timer setting item 102. After activating the program timer 10, a microprocessor 11 of the telephone 1 will activate the ring type set by the calling mode item 103 to inform the user of an incoming call within the set time slot.

Figure 2:
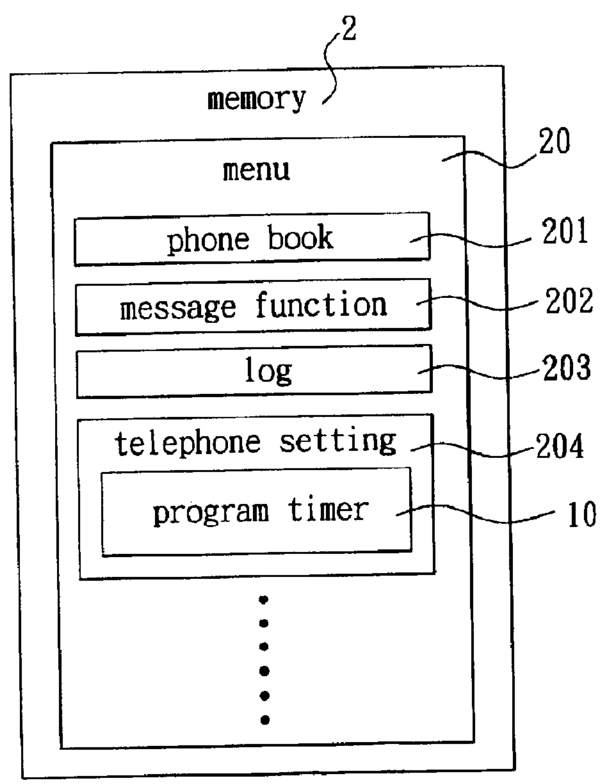
FIG. 2 is a block diagram showing elements of a memory according to the invention.

Referring to FIGS. 1 and 2, in the invention the telephone 1 further comprises a memory 2 having a menu 20 including a plurality of menu items such as a phone book 201, a message function 202, a log 203, a telephone setting 204, etc. As such, the program timer 10 can be one of secondary menus of the telephone setting 204. Hence, as shown in FIG. 1 again, a telephone 1 user may press one or more keys of keypad 13 of the telephone 1 by following instructions shown on a display 12 of the telephone 1 for setting a desired time slot of the program timer 10.

As stated above, referring to FIGS. 1 and 2 again, the on/off item 101 is responsible for controlling the on/off of the program timer 10. Thus, the telephone 1 user can set the on/off of the program timer 10 by pressing one or more keys of keypad 13 by following instructions shown on the display 12. But not all users may daily use the program timer 10. Hence, in practice for turning on or off the program timer 10, the user has to tediously press one or more keys of keypad 13 by following instructions shown on the display 12 and sequentially select the menu 20, the telephone setting 204, the program timer 10, and the on/off item 101 for setting the on/off of the program timer 10. For facilitating the above procedure, a hot key 14 may be provided on a front surface of the telephone 1. The hot key 14 is coupled to the microprocessor 11. In response to a pressing of the hot key 14, the microprocessor 11 is activated to control the on/off of the program timer 10. As an end, time spent on the setting procedure is much reduced.

As to a pressing of the hot key 14 and a response of the microprocessor 11 to control the on/off of the program timer 10, there are two implementations as detailed below.

In a first implementation, the microprocessor 11 is activated to show the on/off item 101 on the display 12 when the hot key 14 is pressed. Hence, the user may press one of more keys of the keypad 13 to set the on/off item 101.

In a second implementation, a first state icon is shown on the display 12 for informing the user that the program timer 10 is in the first state (i.e., the program timer 10 is off). In response to the pressing of the hot key 14, the microprocessor 11 is activated to command the program timer 10 to enter into a second state (i.e., the program timer 10 is on). Also, a second state icon is shown on the display 12. The microprocessor 11 will command the program timer 10 to return to the first state (i.e., the program timer 10 returns to off from the on state) when the hot key 14 is pressed again. Moreover, the first state icon is shown on the display 12.

Referring to FIG. 1 again, in the invention the timer setting item 102 comprises a start time item and a stop time item for enabling the user to set a desired, operable time slot of the program timer 10, i.e., the ring type of the calling mode item 103. For example, the time slot is from 10 PM to 7 AM everyday. The microprocessor 11 will command the telephone 1 to activate (i.e., ring in response to a potential incoming call) as the set ring type of the calling mode item 103 when an internal clock time of the telephone 1 reaches the set start time (e.g., 10 PM). The telephone 1 will maintain at the ready state until the clock time of the telephone 1 reaches the set stop time (e.g., 7 AM).

Referring to FIG. 1 again, in the invention the calling mode item 103 comprises a plurality of settings such as maximum ring volume, large ring volume, medium ring volume, and minimum ring volume. Alternatively, the settings may comprise mute, ring off and vibration, and ring volume small and vibration. In a case that the calling mode item 103 is set at the ring off and vibration mode and the program timer 10 is on, any incoming call will cause the telephone 1 to vibrate for as a way informing. As such, it is possible of preventing the incoming call from bothering the user and/or other members of the family while sleeping.

In another case that the calling mode item 103 is set at the mute, the minimum ring volume, or the ring off and vibration mode and the program timer 10 is on, an emergency or important call is barred from ringing the telephone 1. For solving this problem, an indicator (e.g., LED (light-emitting diode)) 15 may be provided on the telephone 1. The indicator 15 is coupled to the microprocessor 11. Hence, in response to the program timer 10 being on and the timer setting item 102 being at an operable time slot, an incoming call will cause the telephone 1 to activate (e.g., maximum ring volume) based on the set ring type of the calling mode item 103 and enable the indicator 15 to light or flash for signifying the call.

While the invention has been described by means of specific embodiments, numerous modifications and variations could be made thereto by those skilled in the art without departing from the scope and spirit of the invention set forth in the claims.

What is claimed is:

1. A method of automatically changing a calling mode of a telephone having a program timer installed therein as a timer setting changes, the program timer comprising:

an on/off item for controlling an on/off of the program timer;

a timer setting item for setting a time slot of an activation of the program timer; and a calling mode item for setting a plurality of ring types;

wherein when the program timer is on and the time slot has been set by the timer setting item, a microprocessor of the telephone will activate the ring type set by the calling mode item for informing of an incoming call within the time slots, wherein the telephone further comprises a hot key on its surface, the hot key being coupled to the microprocessor and responsive to the hot key being pressed, and the microprocessor being activated to control the on/off of the program timer so that the microprocessor is capable of showing the on/off item on the display when the hot key is pressed and enabling the user to press one or more keys of the keypad to set the on/off item, and wherein prior to the pressing of the hot key, a first state icon is shown on the display for informing the user that the program timer is in the first state, and responsive to the hot key being pressed, the microprocessor is activated to command the program timer to enter into a second state and show a second state icon on the display.

2. The method of claim 1, wherein the telephone further comprises a keypad including a plurality of keys, a display, and a memory having a menu including a plurality of menu items including the program timer so that a user is capable of pressing one or more keys of the keypad by following instructions shown on the display for setting a time slot of the program timer.

3. The method of claim 1, wherein the timer setting item comprises a start time item for setting a start time of the time slot and a stop time item for setting a stop time of the time slot so that when the program timer is on, the microprocessor will command the telephone to activate in response to a potential incoming call as the set ring type of the calling mode item when an internal clock time of the telephone reaches the set start time and the telephone will maintain the same until the clock time of the telephone reaches the set stop time.

4. The method of claim 1, wherein the telephone further comprises an indicator coupled to the microprocessor so that responsive to the program timer being on and the timer setting item being at the time slot, an incoming call will cause the telephone to activate based on the set ring type of the calling mode item and enable the indicator to light for signifying the call.

5. The method of claim 4, wherein the indicator is an LED.

* * * * *